United States Patent
Nakajima et al.

(10) Patent No.: US 9,211,445 B2
(45) Date of Patent: Dec. 15, 2015

(54) GOLF BALL

(71) Applicant: BRIDGESTONE SPORTS CO., LTD., Minato-ku, Tokyo (JP)

(72) Inventors: Tsuyoshi Nakajima, Chichibushi (JP); Yuichiro Ozawa, Chichibushi (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 172 days.

(21) Appl. No.: 14/016,801

(22) Filed: Sep. 3, 2013

(65) Prior Publication Data

US 2015/0065268 A1   Mar. 5, 2015

(51) Int. Cl.
*A63B 37/06* (2006.01)
*A63B 37/00* (2006.01)

(52) U.S. Cl.
CPC ........... *A63B 37/006* (2013.01); *A63B 37/0063* (2013.01); *A63B 37/0068* (2013.01); *A63B 37/0074* (2013.01)

(58) Field of Classification Search
USPC ................................................ 473/351–378
See application file for complete search history.

(56) References Cited

U.S. PATENT DOCUMENTS

| | | | | |
|---|---|---|---|---|
| 4,650,193 A * | 3/1987 | Molitor et al. | ................. | 473/373 |
| 4,726,590 A * | 2/1988 | Molitor | ................. | 473/372 |
| 5,731,371 A * | 3/1998 | Nesbitt et al. | ................. | 524/11 |
| 5,733,977 A * | 3/1998 | Takemura et al. | ............. | 525/105 |
| 5,776,012 A * | 7/1998 | Moriyama et al. | ............. | 473/372 |
| 5,816,944 A * | 10/1998 | Asakura et al. | ................ | 473/372 |
| 5,929,171 A * | 7/1999 | Sano et al. | .................... | 525/261 |
| 6,602,941 B2 * | 8/2003 | Higuchi et al. | ................. | 524/432 |
| 6,786,836 B2 * | 9/2004 | Higuchi et al. | ................. | 473/351 |
| 7,083,532 B2 * | 8/2006 | Ohama | ......................... | 473/371 |
| 7,455,602 B2 * | 11/2008 | Sato et al. | ...................... | 473/383 |
| 7,897,694 B2 * | 3/2011 | Rajagopalan et al. | ...... | 525/328.9 |
| 8,021,249 B2 * | 9/2011 | Higuchi et al. | ................. | 473/384 |
| 8,367,779 B1 * | 2/2013 | Ozawa et al. | ............... | 525/333.2 |
| 8,648,133 B2 * | 2/2014 | Ozawa et al. | .................. | 524/216 |
| 8,802,788 B2 * | 8/2014 | Nakajima et al. | ........... | 525/333.2 |
| 2003/0038399 A1 * | 2/2003 | Scolamiero | .................... | 264/236 |
| 2003/0100383 A1 * | 5/2003 | Jordan | ........................... | 473/371 |
| 2004/0214661 A1 * | 10/2004 | Sullivan et al. | ................ | 473/371 |
| 2005/0004325 A1 * | 1/2005 | Wu et al. | ........................ | 525/462 |
| 2005/0154132 A1 * | 7/2005 | Hakuta et al. | ................. | 525/105 |
| 2006/0073913 A1 * | 4/2006 | Castner | .......................... | 473/371 |

FOREIGN PATENT DOCUMENTS

| | | |
|---|---|---|
| JP | 10-85367 A | 4/1998 |
| JP | 2002-102388 A | 4/2002 |
| JP | 2003-126300 A | 5/2003 |

* cited by examiner

*Primary Examiner* — Alvin Hunter
(74) *Attorney, Agent, or Firm* — Sughrue Mion, PLLC

(57) ABSTRACT

The invention provides a golf ball having a core and a cover of one layer or a plurality of layers, the core being formed of a material molded under heat from a rubber composition which includes (A) a base rubber, (B) an organic peroxide, and (C) water and/or a metal monocarboxylate. The product P×E of the difference P (mol/m$^3$) in crosslink density between the core surface and the core center, as measured based on a toluene swelling test, multiplied by the deflection E (mm) of the core when compressed under a final load of 1,275 N (130 kgf) from an initial load state of 98 N (10 kgf) is at least 28×10$^2$ mol/m$^3$·mm.

16 Claims, No Drawings

GOLF BALL

BACKGROUND OF THE INVENTION

The present invention relates to a golf ball having a core and a cover of one layer or a plurality of layers. More specifically, the invention relates to a golf ball which, by maintaining a good rebound and having a reduced spin rate, is able to achieve an increased distance.

It is known that the hardness and resilience of crosslinked rubber vary according to the moisture content therein, and various ways of adjusting the moisture content within a rubber composition even during golf ball manufacture have been proposed. For example, JP-A 10-85367 discloses a technique that suppresses the decrease in core resilience by minimizing moisture present in a golf ball rubber composition.

JP-A 2002-102388 describes an attempt in which powdered rubber that has been subjected to moisture absorption is added to a rubber composition as a way to lower the rebound of a practice golf ball. However, the above prior art does not address the challenge of providing a golf ball for regulation play which, by maintaining a good rebound and having a reduced spin rate, is able to achieve an increased distance.

Also, JP-A 2003-126300 discloses art which increases the rebound of a golf ball by using zinc oxide having a small particle size in the rubber composition for the golf ball core. However, because this art does not control the crosslink density of the core, a core material which undergoes no decrease in resilience over time and experiences little energy loss cannot be reliably obtained.

SUMMARY OF THE INVENTION

It is therefore an object of the invention to obtain a core material which undergoes little decrease over time in resilience and experiences little energy loss, and to provide a golf ball which undergoes little decrease over time in rebound. It is also an object of the invention to provide a golf ball having an excellent durability.

As a result of extensive investigations, the inventors have discovered that, by forming a golf ball core of a material molded under heat from a rubber composition which includes (A) a base rubber, (B) an organic peroxide, and (C) water and/or a metal monocarboxylate, and by having the product P×E of the difference P (mol/m$^3$) in crosslink density between a surface of the core and a center of the core, as measured based on a toluene swelling test, multiplied by the deflection E (mm) of the core when compressed under a final load of 1,275 N (130 kgf) from an initial load state of 98 N (10 kgf), be at least 28×10$^2$ mol/m$^3$·mm, there is obtained a core material which undergoes little decrease in resilience over time and little energy loss. The inventors have also found that, in a dynamic viscoelasticity test on the hot-molded material containing components (A) to (C), when the loss tangent of the core center is measured at a temperature of −12° C. and a frequency of 15 Hz, letting tan $\delta_1$ be the loss tangent at a dynamic strain of 1% and tan $\delta_{10}$ be the loss tangent at a dynamic strain of 10%, if the slope of these tan $\delta$ values, expressed as $[(\tan \delta_{10} - \tan \delta_1)/(10\% - 1\%)]$, is set to not more than 0.003, there is obtained a core material which undergoes little decrease in resilience over time and little energy loss. Golf balls in which these core materials are used in the core and the core is encased by a cover of one layer or a plurality of layers are able to achieve an increased distance by maintaining a good rebound and having a reduced spin rate, and moreover are endowed with excellent durability.

The golf ball of the invention is thus a golf ball having a core and a cover of one layer or a plurality of layers, in which the core is formed of a material molded under heat from a rubber composition which includes (A) a base rubber, (B) an organic peroxide, and (C) water and/or a metal monocarboxylate. By suitably controlling both the difference in crosslink density between the center and the surface of the core and also the dynamic viscoelastic properties at the center of the core, there can be obtained a golf ball which achieves a reduced spin rate, has a good durability, and moreover undergoes little change in rebound even when used over an extended period of time.

More specifically, in the inventive golf ball having a core and a cover of one layer or a plurality of layers, decomposition of the organic peroxide within the core formulation can be promoted by directly blending water (i.e., a water-containing material) into the core material. In addition, it is known that the decomposition efficiency of the organic peroxide within the core-forming rubber composition changes with temperature, and that, starting at a given temperature, the decomposition efficiency rises with increasing temperature. If the temperature is too high, the amount of decomposed radicals becomes too large, leading to recombination between radicals and deactivation. As a result, fewer radicals act effectively in crosslinking. Here, when a heat of decomposition is generated by decomposition of the organic peroxide during core vulcanization, the vicinity of the core surface remains at substantially the same temperature as the temperature of the vulcanization mold, but the temperature near the core center, due to the accumulation of heat of decomposition by the organic peroxide which has decomposed from the outside, becomes considerably higher than the mold temperature. When water (i.e., a water-containing material) is directly blended into the core, the water acts to promote decomposition of the organic peroxide, and so a radical reaction like that described above can be made to differ in the core center and at the core surface. That is, decomposition of the organic peroxide is further promoted near the center of the core, bringing about greater radical deactivation, and thus further decreasing the amount of active radicals. As a result, it is possible to obtain a core in which the crosslink densities at the core center and at the core surface differ greatly, and also to obtain a core having different dynamic viscoelastic properties at the core center.

By including the above core within a golf ball, it is possible to provide a golf ball which achieves a reduced spin rate and also has an excellent durability and undergoes little change over time in rebound.

When zinc monoacrylate is used instead of water, water is generated from the zinc monoacrylate by heat during kneading of the compounded material. In this way, there can be obtained an effect which is similar to that obtained by including water.

Accordingly, the invention provides the following golf ball.

[1] A golf ball comprising a core and a cover of one layer or a plurality of layers, wherein the core is formed of a material molded under heat from a rubber composition comprising the following components (A) to (C):
(A) a base rubber,
(B) an organic peroxide, and
(C) water and/or a metal monocarboxylate;
and the product P×E of the difference P (mol/m$^3$) in crosslink density between a surface of the core and a center of the core, as measured based on a toluene swelling test, multiplied by the deflection E (mm) of the core when compressed under a final load of 1,275 N (130 kgf) from an initial load state of 98 N (10 kgf) is at least $28 \times 10^2$ mol/m$^3$·mm.

[2] The golf ball of [1], wherein the rubber composition before vulcanization has a moisture content of at least 1,000 ppm.

[3] The golf ball of [1], wherein the core after vulcanization has a higher moisture content at the core center than at the core surface.

[4] The golf ball of [1], wherein the difference between the crosslink density at the core surface and the crosslink density at the core center, both of which are crosslink densities measured based on a toluene swelling test, is at least $9 \times 10^2$ mol/m$^3$.

[5] The golf ball of [1], wherein the rubber composition includes from 0.1 to 5 parts by weight of an organosulfur compound per 100 parts by weight of the base rubber.

[6] The golf ball of [1], wherein the core of the golf ball after molding of the cover has an initial velocity $V_0$, as measured after peeling away the cover, of at least 77.0 m/s and not more than 78.5 m/s.

[7] The golf ball of [1] which satisfies the relationship $V_0 - V_{60} < 0.7$, wherein $V_0$ is the initial velocity of the core in the golf ball after molding of the cover, as measured after peeling away the cover, and $V_{60}$ is the initial velocity of the core 60 days after measuring $V_0$.

[8] The golf ball of [1] wherein, when the loss tangent of the core center is measured at a temperature of −12° C. and a frequency of 15 Hz, letting tan $\delta_1$ be the loss tangent at a dynamic strain of 1% and tan $\delta_{10}$ be the loss tangent at a dynamic strain of 10%, the slope of these tan $\delta$ values, expressed as [(tan $\delta_{10}$−tan $\delta_1$)/(10%−1%)], is not more than 0.003.

[9] The golf ball of [1], wherein the JIS-C hardness difference obtained by subtracting a core center hardness from a core surface hardness is at least 20 and not more than 40.

[10] A golf ball comprising a core and a cover of one layer or a plurality of layers, wherein the core is formed of a material molded under heat from a rubber composition comprising the following components (A) to (C):
(A) a base rubber,
(B) an organic peroxide, and
(C) water and/or a metal monocarboxylate;
and, when the loss tangent of the core center is measured at a temperature of −12° C. and a frequency of 15 Hz, letting tan $\delta_1$ be the loss tangent at a dynamic strain of 1% and tan $\delta_{10}$ be the loss tangent at a dynamic strain of 10%, the slope of these tan $\delta$ values, expressed as [(tan $\delta_{10}$−tan $\delta_1$)/(10%−1%)], is not more than 0.003.

[11] The golf ball of [10], wherein the rubber composition before vulcanization has a moisture content of at least 1,000 ppm.

[12] The golf ball of [10], wherein the core after vulcanization has a higher moisture content at the core center than at the core surface.

[13] The golf ball of [10], wherein the core of the golf ball after molding of the cover has an initial velocity $V_0$, as measured after peeling away the cover, of at least 77.0 m/s and not more than 78.5 m/s.

[14] The golf ball of [10], wherein the rubber composition includes from 0.1 to 5 parts by weight of an organosulfur compound per 100 parts by weight of the base rubber.

[15] The golf ball of [10] which satisfies the relationship $V_0 - V_{60} < 0.7$, wherein $V_0$ is the initial velocity of the core in the golf ball after molding of the cover, as measured after peeling away the cover, and $V_{60}$ is the initial velocity of the core 60 days after measuring $V_0$.

[16] The golf ball of [10], wherein the JIS-C hardness difference obtained by subtracting a core center hardness from a core surface hardness is at least 20 and not more than 40.

DETAILED DESCRIPTION OF THE INVENTION

The invention is described more fully below.

The golf ball of the invention has a core and a cover of one layer or a plurality of layers. The core is not limited only to one layer and may, if necessary, be constructed of two or more layers. The core is formed of a material molded under heat from a rubber composition containing as the essential ingredients the following components (A) to (C):
(A) a base rubber,
(B) an organic peroxide, and
(C) water and/or a metal monocarboxylate.

The base rubber serving as component (A) is not particularly limited, although the use of polybutadiene is especially preferred.

It is desirable for the polybutadiene to have a cis-1,4 bond content on the polymer chain of at least 60 wt %, preferably at least 80 wt %, more preferably at least 90 wt %, and most preferably at least 95 wt %. If the content of cis-1,4 bonds among the bonds on the polybutadiene molecule is too low, the resilience may decrease.

The content of 1,2-vinyl bonds included on the polybutadiene is typically not more than 2%, preferably not more than 1.7%, and more preferably not more than 1.5%, of the polymer chain. If the content of 1,2-vinyl bonds is too high, the resilience may decrease.

The polybutadiene has a Mooney viscosity ($ML_{1+4}$ (100° C.)) of preferably at least 20, and more preferably at least 30, with the upper limit being preferably not more than 120, more preferably not more than 100, and even more preferably not more than 80.

The term "Mooney viscosity" used herein refers to an industrial indicator of viscosity (JIS K6300) measured with a Mooney viscometer, which is a type of rotary plastometer. This value is represented by the unit symbol $ML_{1+4}$ (100° C.), wherein "M" stands for Mooney viscosity, "L" stands for large rotor (L-type), and "1+4" stands for a pre-heating time of 1 minute and a rotor rotation time of 4 minutes. The "100° C." indicates that measurement was carried out at a temperature of 100° C.

The polybutadiene used may be one synthesized using a rare-earth catalyst or a group VIII metal compound catalyst. In this invention, the use of a polybutadiene synthesized with a rare-earth catalyst is especially preferred. Where necessary, an organoaluminum compound, an alumoxane, a halogen-containing compound and a Lewis base may optionally be used in combination with such a catalyst. In the practice of the invention, preferred use may be made of, as the various foregoing compounds, those mentioned in JP-A 11-35633.

Of the above rare-earth catalysts, the use of a neodymium catalyst that uses in particular a neodymium compound, which is a lanthanum series rare-earth compound, is especially recommended. In such cases, a polybutadiene rubber having a high cis-1,4 bond content and a low 1,2-vinyl bond content can be obtained at an excellent polymerization activity.

A polybutadiene rubber synthesized with a catalyst differing from the above lanthanum rare-earth compound may be included in the base rubber. In addition, styrene-butadiene rubber (SBR), natural rubber, polyisoprene rubber, ethylene-propylene-diene rubber (EPDM) or the like may also be included. These may be used singly or two or more may be used in combination.

The organic peroxide (B) used in the invention is not particularly limited, although the use of an organic peroxide having a one-minute half-life temperature of 110 to 185° C. is preferred. A single organic peroxide, or two or more organic peroxides, may be used. The amount of organic peroxide included per 100 parts by weight of the base rubber is preferably at least 0.1 part by weight, and more preferably at least 0.3 part by weight. The upper limit is preferably not more than 5 parts by weight, more preferably not more than 4 parts by weight, and even more preferably not more than 3 parts by weight. A commercially available product may be used as the organic peroxide. Specific examples include those available under the trade names Percumyl D, Perhexa C-40, Niper BW and Peroyl L (all produced by NOF Corporation), and Luperco 231XL (from Atochem Co.).

The water serving as component (C) in the invention is not particularly limited, and may be distilled water or may be tap water. The use of distilled water free of impurities is especially preferred. The amount of water included per 100 parts by weight of the base rubber is preferably at least 0.1 part by weight, and more preferably at least 0.3 part by weight. The upper limit is preferably not more than 5 parts by weight, and more preferably not more than 4 parts by weight.

By including a suitable amount of such water, the moisture content in the rubber composition before vulcanization becomes preferably at least 1,000 ppm, and more preferably at least 1,500 ppm. The upper limit is preferably not more than 8,500 ppm, and more preferably not more than 8,000 ppm. If the moisture content of the rubber composition is too small, it may become difficult to obtain a suitable crosslink density and tan δ, which may make it difficult to mold a golf ball having little energy loss and a reduced spin rate. On the other hand, if the moisture content of the rubber composition is too large, the core may become too soft, which may make it difficult to obtain a suitable core initial velocity.

Although it is also possible to blend water directly into the rubber composition, the following methods (i) to (iii) may be employed to include water:
(i) applying steam or ultrasonically applying water in the form of a mist to some or all of the rubber composition (compounded material);
(ii) immersing some or all of the rubber composition in water;
(iii) letting some or all of the rubber composition stand for a given period of time in a high-humidity environment in a place where the humidity can be controlled, such as a constant humidity chamber.

As used herein, "high-humidity environment" is not particularly limited, so long as it is an environment capable of moistening the rubber composition, although a humidity of from 40 to 100% is preferred.

Or the water can be worked into a jelly state and blended into the above rubber composition. Alternatively, a material obtained by first supporting water on a filler, unvulcanized rubber, rubber powder or the like can be blended into the rubber composition. Because such an approach is easier to carry out than directly blending in water, the golf ball production efficiency can be improved. The type of material in which a given amount of water has been included, although not particularly limited, is exemplified by fillers, unvulcanized rubbers and rubber powders in which sufficient water has been included. The use of a material which undergoes no loss of durability or resilience is especially preferred. The moisture content of the above material is preferably at least 3 wt %, more preferably at least 5 wt %, and even more preferably at least 10 wt %. The upper limit is preferably not more than 99 wt %, and even more preferably not more than 95 wt %.

In this invention, a metal monocarboxylate may be used instead of the above water. Metal monocarboxylates are distinguished from metal dicarboxylates in which carboxylic acid is presumably coordinate bonded to a metal, such as zinc diacrylate of the formula $(CH_2=CHCOO)_2Zn$. A metal monocarboxylate introduces water into the rubber composition by way of a dehydration/condensation reaction, and thus provides an effect similar to that of water. Moreover, because a metal monocarboxylate can be blended into a rubber composition as a powder, the operation can be simplified and uniform dispersion within the rubber composition is easy. In order to carry out the above reaction effectively, a monosalt is required. The amount of metal monocarboxylate included per 100 parts by weight of the base rubber is preferably at least 1 part by weight, and more preferably at least 3 parts by weight. The upper limit in the amount of metal monocarboxylate included is preferably not more than 60 parts by weight, and more preferably not more than 50 parts by weight. If the amount of metal monocarboxylate included is too small, it may be difficult to obtain a suitable crosslink density and tan δ, as a result of which a sufficient golf ball spin rate lowering effect may not be achievable. On the other hand, if too much is included, the core may become too hard, as a result of which it may be difficult for the ball to maintain a suitable feel at impact.

The carboxylic acid used may be, for example, acrylic acid, methacrylic acid, maleic acid, fumaric acid or stearic acid. Examples of the substituting metal include sodium, potassium, lithium, zinc, copper, magnesium, calcium, cobalt, nickel and lead, although the use of zinc is preferred. Illustrative examples of the metal monocarboxylate include zinc monoacrylate and zinc monomethacrylate, with the use of zinc monoacrylate being especially preferred.

In addition to above-described components (A) to (C), it is possible to also include in the rubber composition (D) an organosulfur compound, (E) a co-crosslinking agent and (F) an inert filler. If necessary, an antioxidant may also be included. These ingredients are described in detail below.

(D) Organosulfur Compound

An organosulfur compound may be included in the rubber composition. The organosulfur compound is exemplified by, but not particularly limited to, thiophenols, thionaphthols, halogenated thiophenols, and metal salts thereof. Specific examples include the zinc salts of pentachlorothiophenol, pentafluorothiophenol, pentabromothiophenol and parachlorothiophenol, and diphenylpolysulfides, dibenzylpolysulfides, dibenzoylpolysulfides, dibenzothiazoylpolysulfides and dithiabenzoylpolysulfides having from 2 to 4 sulfurs. These may be used singly or two or more may be used in combination. Of the above, preferred use may be made of the zinc salt of pentachlorothiophenol and/or diphenyldisulfide.

It is recommended that the organosulfur compound be included in an amount, per 100 parts by weight of the base rubber, of preferably at least 0.1 part by weight, more preferably at least 0.2 part by weight, and even more preferably at least 0.5 part by weight, but preferably not more than 5 parts by weight, more preferably not more than 4 parts by weight, and even more preferably not more than 3 parts by weight. If the amount of organosulfur compound included is too large, the material molded under heat from the rubber composition may have a hardness that is too low. On the other hand, if the amount included is too small, an improvement in the resilience may be unlikely to occur.

(E) Co-Crosslinking Agent

The co-crosslinking agent is a metal salt of an α,β-unsaturated carboxylic acid having from 3 to 8 carbons. In the invention, "co-crosslinking agent" refers to a material which lacks the above-described dehydration reaction. Illustrative examples of the α,β-unsaturated carboxylic acid include acrylic acid, methacrylic acid, maleic acid and fumaric acid. Acrylic acid is preferred because it confers a high resilience. The metal of the metal salt is exemplified by zinc, sodium, magnesium, calcium and aluminum, with zinc being especially preferred. Accordingly, zinc acrylate is preferred as the co-crosslinking agent.

The above co-crosslinking agent has an average particle size of preferably from 3 to 30 μm, more preferably from 5 to 25 μm, and even more preferably from 8 to 15 μm. When the co-crosslinking agent has an average particle size of less than 3 μm, it tends to aggregate within the rubber composition, as a result of which the reactivity between acrylic acid molecules increases and the reactivity between molecules of the base rubber decreases, which may make it impossible to obtain an acceptable golf ball rebound. On the other hand, when the co-crosslinking agent has an average particle size greater than 30 μm, the co-crosslinking agent particles are too large, leading to a large variability in the properties of the resulting golf ball. The co-crosslinking agent is included in an amount per 100 parts by weight of the base rubber which, although not particularly limited, is preferably from 3 to 60 parts by weight, more preferably from 5 to 45 parts by weight, and even more preferably from 20 to 40 parts by weight. If the amount included is less than the above range, the material molded under heat from the rubber composition may be too soft, resulting in a poor resilience. On the other hand, if the amount included is greater than the above range, the material molded under heat from the rubber composition may be too hard, resulting in a poor feel at impact for the golf ball.

As mentioned above, when a metal monocarboxylate is used instead of water in this invention, it is preferable for the relative proportions of the above co-crosslinking agent and the metal monocarboxylate, expressed as the weight ratio therebetween (metal monocarboxylate/co-crosslinking agent), to be within the range of 0.1 to 10.

(F) Inert Filler

Illustrative examples of inert fillers include inorganic fillers such as zinc oxide, barium sulfate and calcium carbonate. The amount of inert filler included per 100 parts by weight of the base rubber is preferably at least 1 part by weight, more preferably at least 3 parts by weight, and even more preferably at least 5 parts by weight. The upper limit is preferably not more than 100 parts by weight, more preferably not more than 60 parts by weight, even more preferably not more than 45 parts by weight, and most preferably not more than 40 parts by weight.

Antioxidant

In this invention, an antioxidant may be optionally included in the rubber composition. For example, use may be made of a commercially available product such as Nocrac NS-6, Nocrac NS-30 or Nocrac 200 (all products of Ouchi Shinko Chemical Industry Co., Ltd.). These may be used singly or two or more may be used in combination. The amount of antioxidant included is not particularly limited, and may be set to preferably at least 0.1 part by weight, and more preferably at least 0.15 part by weight, per 100 parts by weight of the base rubber. The upper limit may be set to preferably not more than 5.0 parts by weight, more preferably not more than 4.0 parts by weight, and even more preferably not more than 3.0 parts by weight. If too much or too little antioxidant is included, a proper core hardness gradient may not be obtained, which may make it impossible to achieve a good rebound, durability and spin rate-lowering effect on full shots.

The core in this invention can be obtained by using a method similar to that used in conventional golf ball rubber compositions to vulcanize and cure the above-described rubber composition. Exemplary vulcanization conditions include a vulcanization time of between 100 and 200° C. and a vulcanization time of between 5 and 40 minutes.

It is recommended that the core diameter be preferably at least 30 mm, more preferably at least 32 mm, and even more preferably at least 34 mm, but preferably not more than 40 mm, more preferably not more than 39 mm, and even more preferably not more than 38 mm. If the diameter is too small, a sufficient spin rate-lowering effect and a sufficient rebound may not be achievable. On the other hand, if the diameter is too large, it may not be possible to obtain a sufficient spin rate-lowering effect, in addition to which the effects normally conferred by the cover may not be attainable.

It is recommended that the core (hot-molded material) have a deflection when compressed under a final load of 1,275 N (130 kgf) from an initial load state of 98 N (10 kgf) which, although not particularly limited, is preferably at least 2.5 mm, more preferably at least 2.8 mm, and even more preferably at least 3.0 mm, but is preferably not more than 8.0 mm, more preferably not more than 7.8 mm, and even more preferably not more than 7.5 mm. If the deflection is too much larger than the above range, the core will become too soft, as a result of which a sufficient spin rate-lowering effect may not be obtained and the rebound may decrease. On the other hand, if the deflection is too much smaller than the above value, a spin rate-lowering effect may not be obtained and the feel of the ball at impact may end up becoming hard.

Next, the core hardness is explained.

The core has a center hardness which, when expressed in terms of JIS-C hardness, although not particularly limited, is preferably at least 45, more preferably at least 50, and even more preferably at least 52. The upper limit value is preferably not more than 70, more preferably not more than 65, and even more preferably not more than 60. At a core center hardness outside of the above range, the feel of the ball at impact may worsen, the durability of the ball may decrease, and a spin rate-lowering effect may not be attainable.

The core has a surface hardness which, when expressed in terms of JIS-C hardness, although not particularly limited, is preferably at least 65, more preferably at least 70, and even more preferably at least 72. The upper limit value is preferably not more than 95, more preferably not more than 90, and even more preferably not more than 88. At a core surface hardness lower than the above range, the spin rate may increase too much and the resilience may decrease, as a result of which a sufficient distance may be obtained. On the other hand, at a core surface hardness higher than the above range, the feel at impact may become too hard or the durability to cracking on repeated impact may worsen.

The JIS-C hardness difference obtained by subtracting the core center hardness from the core surface hardness (core surface hardness−core center hardness), although not particularly limited, is preferably at least 15, more preferably at least 17, and even more preferably at least 20. The upper limit is preferably not more than 40, more preferably not more than 35, and even more preferably not more than 30. If the above hardness difference value is too small, the spin rate-lowering effect on shots with a W#1 may be inadequate, as a result of which a good distance may not be achieved. On the other hand, if the hardness difference value is too large, the initial velocity of the golf ball when actually shot may decrease, resulting in a poor distance, and the durability to cracking on repeated impact may worsen. As used herein, "center hardness" refers to the hardness as measured at the center of the cross-section obtained by cutting the core in half through the center, and "surface hardness" refers to the hardness measured at the core surface (spherical surface). Also, "JIS-C hardness" refers to the hardness measured with a JIS-C spring-type durometer, as specified in JIS K 6301-1975.

In this invention, it is preferable for the core center in the vulcanized core to have a higher moisture content than the core surface. The moisture content of the molded core can be suitably controlled by way of such factors as the amount of water blended into the rubber composition, the molding temperature and the molding time.

The moisture content at the core center, although not particularly limited, is preferably at least 1,000 ppm, more preferably at least 1,200 ppm, and even more preferably at least 1,500 ppm. The upper limit is preferably not more than 7,000 ppm, more preferably not more than 6,000 ppm, and even more preferably not more than 5,000 ppm. The moisture content at the core surface, although not particularly limited, is preferably at least 800 ppm, more preferably at least 1,000 ppm, and even more preferably at least 1,200 ppm. The upper limit is preferably not more than 5,000 ppm, more preferably not more than 4,000 ppm, and even more preferably not more than 3,000 ppm. The (core surface moisture content−core center moisture content) value is preferably 0 ppm or below, more preferably −100 ppm or below, and even more preferably −200 ppm or below. The lower limit value is preferably −1,000 ppm or above, more preferably −700 ppm or above, and even more preferably −600 ppm or above.

Measurement of the above moisture content can be carried out with ordinary instruments. For example, using a Hiranuma AQ-2100 micro-moisture analyzer and an EV-2000 moisture vaporizer (both available from Hiranuma Sangyo Corporation), measurement of the moisture content can be carried out at a measurement temperature of 130° C., a keep-warm time of 3 minutes and a background measurement time of 30 seconds.

Letting $V_0$ be the initial velocity of the core measured after removing the cover from a ball obtained by molding a cover material over a core and letting $V_{60}$ be the initial velocity of the core measured 60 days after the day on which $V_0$ was measured, $V_0$ is preferably at least 77.0 m/s, more preferably at least 77.1 m/s, and even more preferably at least 77.2 m/s, but preferably not more than 78.5 m/s, more preferably not more than 78.3 m/s, and even more preferably not more than 78.0 m/s. $V_{60}$ is preferably at least 77.0 m/s, and more preferably at least 77.1 m/s, but preferably not more than 77.8 m/s, more preferably not more than 77.7 m/s, and even more preferably not more than 77.6 m/s. In cases where core initial velocities $V_0$ and $V_{60}$ within the above ranges cannot be obtained, achieving a satisfactory distance is difficult. Also, if the core initial velocity is too high, the golf ball may not conform to the Rules of Golf.

The value $V_0-V_{60}$ preferably satisfies the relationship $V_0-V_{60}<0.7$, more preferably satisfies the relationship $V_0-V_{60}<0.6$, and still more preferably satisfies the relationship $V_0-V_{60}<0.5$. In this invention, in cases where moisture has been blended in a good balance into the core, even if the core comes directly into contact with the atmosphere, it is not readily influenced by the humidity, enabling changes in the core initial velocity to be suppressed.

In the invention, the core initial velocity can be measured using an initial velocity measuring apparatus of the same type as the USGA drum rotation-type initial velocity instrument approved by the R&A. In this case, the core can be tested in a chamber at a room temperature of 23±2° C. after being held isothermally in a 23±1° C. environment for at least 3 hours.

Next, the crosslink density of the core is explained.

In this invention, the crosslink density at the center of the core is preferably at least $6.0\times10^2$ mol/m$^3$, more preferably at least $7.0\times10^2$ mol/m$^3$, and even more preferably at least $8.0\times10^2$ mol/m$^3$. The upper limit value is preferably not more than $15.0\times10^2$ mol/m$^3$, more preferably not more than $14.0\times10^2$ mol/m$^3$, and even more preferably not more than $13.0\times10^2$ mol/m$^3$. Also, the crosslink density at the surface of the core is preferably at least $13.0\times10^2$ mol/m$^3$, more preferably at least $14.0\times10^2$ mol/m$^3$, and even more preferably at least $15.0\times10^2$ mol/m$^3$. The upper limit value is preferably not more than $30.0\times10^2$ mol/m$^3$, more preferably not more than $28.0\times10^2$ mol/m$^3$, and even more preferably not more than $26.0\times10^2$ mol/m$^3$. The difference in crosslink density between the core center and the core surface, expressed as (crosslink density of core surface)−(crosslink density of core center), is preferably at least $9.0\times10^2$ mol/m$^3$ and preferably not more than $30.0\times10^2$ mol/m$^3$. If the crosslink density at the core center or the core surface falls outside of the above ranges, there is a possibility that the water within the rubber composition may not fully contribute to decomposition of the organic peroxide during vulcanization, as a result of which a sufficient spin rate-lowering effect on the ball may not be obtained.

The crosslink density can be measured by the following procedure.

A circular disk having a thickness of 2 mm is cut out by passing through the geometric center of the core. Next, using a punching press, samples having a diameter of 3 mm are punched out at the core center and at measurement places not more than 4 mm inward of respective sites corresponding to the core surface, and the sample weights are measured with an electronic balance capable of measurement in units of two decimal places (mg). The sample and 8 mL of toluene are placed in a 10 mL vial, and the vial is closed with a stopper and left at rest for at least 72 hours, following which the solution is discarded and the sample weight following immersion is measured. Using the Flory-Rehner equation, the crosslink density of the rubber composition is calculated from the sample weights before and after swelling.

$$\nu=-(ln(1-v_r)+v_r+\chi v_r^2)/V_s(v_r^{1/3}-v_r/2)$$

(where $\nu$ is the crosslink density, $v_r$ is the volume fraction of rubber in the swollen sample, $\chi$ is an interaction coefficient, and $V_s$ is the molar volume of toluene)

$$v_r=V_{BR}/(V_{BR}+V_T)$$

$$V_{BR}=(w_f-w_f v_f)/\rho$$

$$V_T=(w_s-w_f)/\rho_T$$

(where $V_{BR}$ is the volume of butadiene rubber in the rubber composition, $V_T$ is the volume of toluene in the swollen sample, $v_f$ is the weight fraction of filler in the rubber composition, $\rho$ is the density of the rubber composition, $w_f$ is the sample weight before immersion, $w_s$ is the sample weight after immersion, and $\rho_T$ is the density of toluene)

Calculation is carried out at a $V_s$ value of $0.1063\times10^{-3}$ m$^3$/mol, a $\rho_T$ value of 0.8669, and at a value for $\chi$, based on the literature (*Macromolecules* 2007, 40, 3669-3675), of 0.47.

Next, the product P×E of the difference in crosslink density P (mol/m$^3$) between the core surface and the core center, expressed as (crosslink density at core surface)−(crosslink density at core center), multiplied by the deflection E (mm) of the core when compressed under a final load of 1,275 N (130 kgf) from an initial load state of 98 N (10 kgf) is explained. Generally, as the core hardness becomes higher, i.e., as the core deflection E (mm) becomes smaller, the above difference P (mol/m³) in crosslink density tends to become larger. By multiplying E by P as described above, the influence of the core hardness can be canceled out, enabling the value P×E to be used as an indicator of the reduction in spin rate. The above P×E value is preferably at least 26×10² mol/m³·mm, more preferably at least 27×10² mol/m³·mm, and even preferably at least 28×10² mol/m³·mm. As explained above, with the emergence of a difference in crosslink density between the core center and the core surface, a golf ball can be obtained which has a lower spin rate, a higher durability and also, even with use over an extended period of time, no decline in initial velocity.

Next, the method of measuring the dynamic viscoelasticity of the core is explained.

Generally, the viscoelasticity of a rubber material is known to have a strong influence on the performance of rubber products. Also, with regard to the loss tangent (tan δ), which represents the ratio of energy lost to energy stored, it is known that a smaller tan δ is associated with a larger contribution by the elasticity component in rubber, and that a larger tan δ is associated with a larger contribution by the viscosity component. In this invention, in a dynamic viscoelasticity test on vulcanized rubber at the core center in which measurement is carried out at a temperature of −12° C. and a frequency of 15 Hz, letting tan $δ_1$ be the loss tangent at a dynamic strain of 1% and tan $δ_{10}$ be the loss tangent at a dynamic strain of 10%, the slope of these tan δ values, expressed as [(tan $δ_{10}$−tan $δ_1$)/(10%−1%)], is preferably not more than 0.003, and more preferably not more than 0.002. If the above tan δ values become large, the energy loss by the core becomes too large, which may make it difficult to obtain a satisfactory rebound and a spin rate-lowering effect. Various methods may be employed to measure the dynamic viscoelasticity performance of the core. For example, a circular disk having a thickness of 2 mm may be cut out of the core encased by the cover by passing through the geometric center thereof, following which, with this as the sample, a punching press may be used to punch out a 3 mm diameter specimen at the place of measurement. In addition, by employing a dynamic viscoelasticity measuring apparatus (such as that available under the product name EPLEXOR 500N from GABO) and using a compression test holder, the tan δ values under dynamic strains of 0.01 to 10% can be measured at an initial strain of 35%, a measurement temperature of −12° C. and a frequency of 15 Hz, and the slope determined based on the results of these measurements.

Next, the cover of one layer or a plurality of layers encasing the core is described.

The cover material is not particularly limited, although use can be made of known materials such as various ionomeric resins and urethane elastomers that are used in golf balls.

To achieve an even further spin rate-lowering effect, it is especially preferable to use a highly neutralized ionomeric material in the layer adjoining the core. Specifically, the use of a material formulated from components (a) to (d) below is preferred; that is, a mixed material obtained by the admixture of: 100 parts by weight of a resin component obtained by blending (a) a base resin containing
(a-1) an olefin-unsaturated carboxylic acid random copolymer and/or a metal ion neutralization product of an olefin-unsaturated carboxylic acid random copolymer, and
(a-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio of from 100/0 to 0/100 with
(b) a non-ionomeric thermoplastic elastomer in a weight ratio of from 100/0 to 50/50;
(c) from 5 to 80 parts by weight of a fatty acid and/or fatty acid derivative having a molecular weight of between 228 and 1500; and
(d) from 0.1 to 17 parts by weight of a basic inorganic metal compound capable of neutralizing unneutralized acid groups on component (a) and component (c).

In cases where a mixed material of above components (a) to (d) is used, it is especially preferable to use a mixed material in which at least 70% of the acid groups are neutralized.

The material making up the outermost layer of the cover is preferably one composed primarily of a urethane material, and especially a thermoplastic urethane elastomer.

In addition, one, two or more intermediate cover layers may be formed between the cover layer adjoining the core and the outermost cover layer. In such a case, the use of a thermoplastic resin such as an ionomer as the intermediate layer material is preferred.

To obtain the cover in this invention, use may be made of, for example, a method in which a single-layer core or a multilayer core of two or more layers that has been prefabricated according to the type of ball is placed within a mold, then the above mixture is mixed and melted under applied heat and injection-molded over the core so as to encase the core with the desired cover. In this case, cover production can be carried out in a state where excellent thermal stability, flow properties and processability are achieved. As a result, the golf ball ultimately obtained has a high rebound, and moreover has a good feel at impact and an excellent scuff resistance. Alternatively, use may be made of a cover-forming method other than the foregoing, such as one in which, for example, a pair of hemispherical half-cups are molded beforehand from the cover material of the invention, following which the core is enclosed within the half-cups and molding is carried out under applied pressure at 120 to 170° C. for 1 to 5 minutes.

In cases where the cover has only one layer, the thickness of that layer may be set to from 0.3 to 3 mm. In cases where the cover has two layers, the thickness of the outer cover layer may be set in the range of 0.3 to 2.0 mm, and the thickness of the inner cover layer may be set in the range of 0.3 to 2.0 mm. The Shore D hardnesses of the respective layers making up the cover (cover layers) are not particularly limited, but are preferably at least 40, and more preferably at least 45. The upper limit is preferably not more than 70, and more preferably not more than 65.

Numerous dimples are formed on the surface of the outermost layer of the cover, in addition to which the cover may be subjected to various types of treatment, such as surface preparation, stamping and painting. Particularly in cases where such surface treatment is imparted to the cover formed of the inventive cover material, the good moldability of the cover surface enables surface treatment to be carried out effectively.

The invention provides a golf ball in which the above-described rubber composition is used as the core material for at least one layer of the core. The type of golf ball is not particularly limited, provided the ball has a core and at least one cover layer. For example, the rubber composition may be used in the core of a solid golf ball, such as a two-piece or three-piece solid golf ball having a solid core encased by a cover or a multi-piece golf ball having a construction of three or more layers, or as the core in a wound golf ball composed of a wound core encased by a single layer cover or a cover having a multilayer construction of two or more layers.

As described above, because the golf ball of the invention uses a core material which undergoes little decrease in resilience over time and little energy loss, the ball maintains a good rebound and has a reduced spin rate, thus achieving an increased distance, in addition to which it has an excellent durability.

EXAMPLES

Examples of the invention and Comparative Examples are given below by way of illustration, although the invention is not limited by the following Examples.

Examples 1 to 7, Comparative Examples 1 to 6

The cores for Examples 1 to 7 and Comparative Examples 1 to 6 were fabricated using the core materials composed primarily of polybutadiene shown in Table 1 below.

Deflection of the Core Under Specific Loading

The deflection by the core when compressed under a final load of 1,275 N (130 kgf) from an initial load state of 98 N (10 kgf) was measured. The average values for 30 cores (n=30) are shown in Tables 3 and 4.

Core Hardness Profile The surface of the core is spherical. The indenter of a durometer was set so as to be substantially perpendicular to the spherical surface, and the core surface hardness in terms of JIS-C hardness was measured as specified in JIS K6301-1975.

With regard to the center hardness of the core, the core was cut in half through the center with a fine cutter, and the JIS-C hardness at the center of the cross-section was measured.

Core Moisture Content

Using a Hiranuma AQ-2100 micro-moisture analyzer and an EV-2000 moisture vaporizer (both available from Hiranuma Sangyo Corporation), measurement of the moisture content was carried out at a measurement temperature of 130° C., a keep-warm time of 3 minutes and a background

TABLE 1

(units: parts by weight)

| | Example | | | | | | | Comparative Example | | | | | |
|---|---|---|---|---|---|---|---|---|---|---|---|---|---|
| | 1 | 2 | 3 | 4 | 5 | 6 | 7 | 1 | 2 | 3 | 4 | 5 | 6 |
| Polybutadiene: BR51 | 100 | 100 | 100 | 100 | 100 | | 100 | 100 | 100 | | | 100 | 100 |
| Polybutadiene: BR01 | | | | | | 100 | | | | 100 | 100 | | |
| Zinc oxide | 4 | 4 | 4 | 4 | 4 | 4 | 4 | 4 | 4 | 4 | 4 | 4 | 4 |
| Barium sulfate | | | | | for modification of specific gravity | | | | | | | | |
| Antioxidant | 0.1 | 0.1 | 0.1 | 0.1 | 0.1 | 0.1 | 0.1 | 0.1 | 0.1 | 0.1 | 0.1 | 0.1 | 0.1 |
| Zinc salt of pentachloro-thiophenol | 0.6 | 0.6 | 0.6 | 0.6 | 1 | 0.6 | 0.6 | 0.6 | 0.6 | 0.6 | 0.6 | 0.6 | 0.6 |
| Zinc acrylate | 36 | 36 | 36 | 25 | 24 | 36 | 5 | 36 | 28 | 36 | 28 | 30 | 36 |
| Water | 0.5 | 1 | 1.5 | | | 1 | | | | | | | 0.01 |
| Zinc monoacrylate | | | | 7.5 | 15 | | 60 | | | | | 0.1 | |
| Organic peroxide | 1 | 1 | 1 | 1 | 1 | 1 | 1 | 1 | 1 | 1 | 1 | 1 | 1 |
| Moisture content of mixed rubber (ppm) | 2,077 | 2,661 | 3,184 | 1,532 | 1,923 | 2,053 | 3,519 | 784 | 801 | 743 | 759 | 810 | 881 |

Details on the above formulations are given below.
Polybutadiene rubber: Trade name, "BR 51" (from JSR Corporation); polymerized with a neodymium catalyst
Polybutadiene rubber: Trade name, "BR 01" (from JSR Corporation); polymerized with a nickel catalyst
Zinc oxide: Trade name, "Zinc Oxide Grade 3" (from Sakai Chemical Co., Ltd.)
Barium sulfate: Trade name, "Barico #100" (from Hakusui Tech)
Antioxidant: Trade name, "Nocrac NS-6" (from Ouchi Shinko Chemical Industry Co., Ltd.)
Zinc salt of pentachlorothiophenol: from Wako Pure Chemical Industries, Ltd.
Zinc acrylate: from Nippon Shokubai Co., Ltd.
Distilled water: from Wako Pure Chemical Industries, Ltd.
Zinc monoacrylate: from Nippon Shokubai Co., Ltd.
Organic Peroxide: Dicumyl peroxide, available under the trade name "Percumyl D" from NOF Corporation Each of the cores fabricated as described above was tested for deformation under a specific loading, hardness profile, moisture content, crosslink density, dynamic viscoelastic properties and initial velocity of the core after standing. The results are shown in Tables 3 and 4.

measurement time of 30 seconds. The interval time was set to 99 seconds, and the current was set to "fast." Measurement results within a radius of 5 mm from the core center were treated as core center moisture contents, and measurement results within 5 mm of the core surface were treated as core outside moisture contents.

Crosslink Density of Core (Toluene Swelling Test)

A circular disk having a thickness of 2 mm was cut out by passing through the geometric center of the core. Next, using a punching press, samples having a diameter of 3 mm were punched out at the places of measurement, and the sample weight was measured using an electronic balance capable of measurement in units of two decimal places (mg). The sample and 8 mL of toluene were added to a 10 mL vial, following which the vial was closed with a stopper and left at rest. After 72 hours had elapsed, the liquid within the vial was discarded and the sample weight following immersion was measured. Using the Flory-Rehner equation, the crosslink density of the rubber composition was calculated from the sample weights before and after swelling.

$$v = -(ln(1-v_r) + v_r + \chi v_r^2)/V_s(v_r^{1/3} - v_r/2)$$

(where ν is the crosslink density, $v_r$ is the volume fraction of rubber in the swollen sample, $\chi$ is an interaction coefficient, and $V_s$ is the molar volume of toluene)

$$v_r = V_{BR}/(V_{BR}+V_T)$$

$$V_{BR} = (w_f - w_f v_f)/\rho$$

$$V_T = (w_s - w_f)/\rho_T$$

(where $V_{BR}$ is the volume of butadiene rubber in the rubber composition, $V_T$ is the volume of toluene in the swollen sample, $v_f$ is the weight fraction of filler in the rubber composition, $\rho$ is the density of the rubber composition, $w_f$ is the sample weight before immersion, $w_s$ is the sample weight after immersion, and $\rho_T$ is the density of toluene)

Calculation was carried out at a $V_s$ value of $0.1063 \times 10^3$ m³/mol, a $\rho_T$ value of 0.8669, and at a value for $\chi$, based on the literature (*Macromolecules* 2007, 40, 3669-3675), of 0.47.

Dynamic Viscoelastic Properties of Core

A circular disk having a thickness of 2 mm was cut out by passing through the geometric center of the core. With this as the sample, a punching press was used to punch out a 3 mm diameter specimen at the place of measurement. By employing a dynamic viscoelasticity measuring apparatus (such as that available under the product name EPLEXOR 500N from GABO) and using a compression test holder, the loss tangents (tan δ) under dynamic strains of 0.01 to 10% were measured at an initial strain of 35%, a measurement temperature of −12° C. and a frequency of 15 Hz.

Initial Velocity after Core Standing

A core was prepared by peeling the cover off of a golf ball. Letting the core initial velocity measured on the day that the cover was peeled off be the Day 0 result, the initial core velocities when 30 days and 60 days had elapsed thereafter were treated as the Day 30 and Day 60 results. The core was left standing in a chamber controlled to a temperature of 24° C. and 40% humidity. The initial velocity was measured using an initial velocity measuring apparatus of the same type as the USGA drum rotation-type initial velocity instrument approved by the R&A. The core was tested in a chamber at a room temperature of 23±2° C. after being held isothermally in a 23±1° C. environment for at least 3 hours. Twenty balls were each hit twice. The time taken for the ball to traverse a distance of 6.28 ft (1.91 m) was measured and used to compute the initial velocity. This cycle was carried out over a period of about 15 minutes.

Next, using a three-layer cover (envelope layer, intermediate layer and outermost layer) having the properties shown in Table 2 below, a multi-piece solid golf ball having a four-layer construction composed of a core encased by, in order, an envelope layer, an intermediate layer and an outermost layer was obtained for each of the cores produced above. Although not shown in a diagram, dimples in a certain pattern common to each ball were formed on the surface of the ball cover in all of the Examples according to the invention and the Comparative Examples.

TABLE 2

| Outermost layer | Material | urethane[*1] |
|---|---|---|
|  | Thickness | 0.8 mm |
| Intermediate layer | Material | ionomer[*2] |
|  | Thickness | 1.13 mm |
| Envelope layer | Material | ionomer[*3] |
| (layer adjacent to core) | Thickness | 1.35 mm |

[*1] A urethane compound using three types of urethane: Pandex T8283, Pandex T8290 and Pandex T8295, all from DIC-Bayer Polymer, Ltd.
[*2] An ionomer compound using three types of ionomer: Himilan 1605, Himilan 1706 and Himilan 1557, all from DuPont-Mitsui Polychemicals Co., Ltd.
[*3] HPF1000, from E.I. DuPont de Nemours & Co.

The properties (spin rate, feel at impact, durability) of the golf balls in these Examples and Comparative Examples were evaluated as follows. The results are presented in Table 3 and 4.

[Evaluation of Ball Properties]

Ball Deflection (Mm)

The deflection (mm) of a golf ball when compressed under a final load of 1,275 N (130 kgf) from an initial load state of 98 N (10 kgf) was measured.

Spin Rate of Ball (rpm)

A driver (W#1) manufactured by Bridgestone Sports Co., Ltd. (TourStage ViQ (2012 model); loft angle, 11.5°) was mounted on a golf swing robot and used to strike balls at a head speed (HS) of 45 m/s. A number 6 iron (I#6) manufactured by Bridgestone Sports Co., Ltd. (TourStage ViQ (2012 model)) was mounted on a golf swing robot and used to strike balls at a head speed (HS) of 38 m/s. The balls immediately after being struck were measured with an apparatus for measuring the initial conditions.

Durability of Ball

The durability of the golf ball was evaluated using an ADC Ball COR Durability Tester produced by Automated Design Corporation (U.S.). This tester fires a golf ball pneumatically and causes it to repeatedly strike two metal plates arranged in parallel. The incident velocity against the metal plates was set at 43 m/s. The number of shots required for the golf ball to crack was measured, and the average value obtained from measurements of five golf balls (n=5) was determined.

Good: 100 shots or more

Fair: from 50 to 99 shots

NG: 49 shots or less

Feel of Ball at Impact

Using a W#1 golf club, a sensory evaluation was carried out under the following criteria by a panel of ten amateur golfers having head speeds of from 35 to 40 m/s.

Good: at least seven out of the ten golfers experienced a good feel at impact

Fair: five or six of the golfers experienced a good feel at impact

NG: four or fewer of the ten golfers experienced a good feel at impact

TABLE 3

|  |  |  | Example | | | | | | |
|---|---|---|---|---|---|---|---|---|---|
|  |  |  | 1 | 2 | 3 | 4 | 5 | 6 | 7 |
| Core | Diameter (mm), average | | 36.95 | 36.96 | 36.95 | 36.95 | 36.95 | 36.96 | 36.96 |
| properties | Weight (g), average | | 32.01 | 32.03 | 32.03 | 32.03 | 32.03 | 32.04 | 32.03 |
|  | Deflection under load (mm), average | | 3.35 | 3.89 | 3.86 | 3.71 | 3.80 | 3.95 | 3.67 |
| Hardness | Center | | 60.8 | 56.5 | 54.3 | 59.0 | 57.7 | 56.4 | 59.0 |
| profile | Surface | | 85.0 | 83.6 | 83.8 | 84.1 | 85.6 | 82.2 | 86.1 |

TABLE 3-continued

| | | Example 1 | Example 2 | Example 3 | Example 4 | Example 5 | Example 6 | Example 7 |
|---|---|---|---|---|---|---|---|---|
| (JIS-C) | Surface − Center | 24.3 | 27.2 | 29.5 | 25.2 | 28.0 | 25.8 | 27.1 |
| Core moisture content (ppm) | Center | 1501 | 2003 | 2437 | 1754 | 1894 | 1839 | 2529 |
| | Surface | 1421 | 1565 | 1871 | 1620 | 1728 | 1621 | 2232 |
| | Surface − Center | −80 | −438 | −566 | −134 | −166 | −218 | −297 |
| Crosslink density | ($\times 10^2$ mol/m$^3$) Center | 10.8 | 9.1 | 10.6 | 10.8 | 10.0 | 9.8 | 9.9 |
| | Intermediate | 11.7 | 10.2 | 11.0 | 11.9 | 11.0 | 10.4 | 10.4 |
| | Outside | 20.3 | 22.0 | 24.8 | 20.0 | 23.3 | 20.2 | 25.3 |
| | Outside − Center, P | 9.5 | 12.9 | 14.2 | 9.2 | 13.2 | 10.4 | 15.4 |
| | ($\times 10^2$ mol/m$^3 \cdot$mm) P × E | 31.7 | 50.1 | 54.7 | 34.1 | 50.2 | 41.1 | 56.5 |
| Tan δ at core center | 0.1% strain | 0.047 | 0.039 | 0.038 | 0.04 | 0.037 | 0.042 | 0.04 |
| | 1% strain | 0.052 | 0.039 | 0.039 | 0.049 | 0.038 | 0.045 | 0.043 |
| | 10% strain | 0.066 | 0.054 | 0.053 | 0.062 | 0.051 | 0.06 | 0.057 |
| | Slope of 10% strain and 1% strain | 0.0016 | 0.0017 | 0.0016 | 0.0014 | 0.0014 | 0.0017 | 0.0016 |
| Initial velocity after core standing (m/s) | 0 days of standing ($V_0$) | 77.55 | 77.32 | 77.30 | 77.40 | 77.49 | 77.25 | 77.35 |
| | 30 days of standing ($V_{30}$) | 77.29 | 77.11 | 77.08 | 77.14 | 77.29 | 77.06 | 77.12 |
| | 60 days of standing ($V_{60}$) | 77.07 | 76.93 | 76.92 | 76.93 | 77.08 | 76.84 | 76.89 |
| | Initial velocity difference ($V_{30} - V_0$) | 0.26 | 0.21 | 0.22 | 0.26 | 0.20 | 0.19 | 0.23 |
| | Initial velocity difference ($V_{60} - V_0$) | 0.48 | 0.39 | 0.38 | 0.47 | 0.41 | 0.41 | 0.46 |
| Ball properties | Deflection under load (mm), average | 2.50 | 2.75 | 2.72 | 2.75 | 2.65 | 2.80 | 2.49 |
| Spin rate (rpm) | Driver (W#1) | 2711 | 2540 | 2552 | 2587 | 2584 | 2530 | 2711 |
| | Iron (I#6) | 6231 | 5566 | 5552 | 5758 | 5673 | 5611 | 6209 |
| | Durability | good | good | good | good | good | good | good |
| | Feel at impact | good | good | good | good | good | good | good |

TABLE 4

| | | Comparative Example 1 | Comparative Example 2 | Comparative Example 3 | Comparative Example 4 | Comparative Example 5 | Comparative Example 6 |
|---|---|---|---|---|---|---|---|
| Core properties | Diameter (mm), average | 36.85 | 36.85 | 36.90 | 36.91 | 36.95 | 36.95 |
| | Weight (g), average | 31.80 | 31.80 | 31.89 | 31.96 | 32.01 | 32.03 |
| | Deflection under load (mm), average | 2.72 | 3.80 | 2.89 | 3.93 | 3.34 | 2.75 |
| Hardness profile (JIS-C) | Center | 66.4 | 63.2 | 64.4 | 62.1 | 65.2 | 65.4 |
| | Surface | 84.0 | 80.2 | 82.1 | 80.0 | 83.5 | 84.0 |
| | Surface − Center | 17.6 | 17.0 | 17.7 | 17.9 | 18.3 | 18.6 |
| Core moisture content (ppm) | Center | 884 | 737 | 805 | 834 | 794 | 805 |
| | Surface | 1621 | 1669 | 1719 | 1643 | 1783 | 1713 |
| | Surface − Center | 737 | 932 | 914 | 809 | 989 | 908 |
| Crosslink density | ($\times 10^2$ mol/m$^3$) Center | 13.3 | 10.3 | 12.7 | 9.5 | 12.5 | 13.3 |
| | Intermediate | 13.1 | 10.8 | 13.0 | 10.0 | 12.8 | 13.4 |
| | Outside | 21.9 | 17.2 | 20.3 | 15.7 | 19.8 | 21.8 |
| | Outside − Center, P | 8.5 | 6.8 | 7.6 | 6.2 | 7.3 | 8.4 |
| | ($\times 10^2$ mol/m$^3 \cdot$mm) P × E | 23.2 | 25.9 | 22.0 | 24.4 | 24.4 | 23.2 |
| Tan δ at core center | 0.1% strain | 0.054 | 0.049 | 0.05 | 0.046 | 0.052 | 0.052 |
| | 1% strain | 0.061 | 0.048 | 0.055 | 0.046 | 0.058 | 0.059 |
| | 10% strain | 0.097 | 0.093 | 0.087 | 0.087 | 0.092 | 0.093 |
| | Slope of 10% strain and 1% strain | 0.0040 | 0.0050 | 0.0036 | 0.0046 | 0.0038 | 0.0038 |
| Initial velocity after core standing (m/s) | 0 days of standing ($V_0$) | 78.05 | 77.28 | 77.85 | 77.20 | 77.53 | 77.98 |
| | 30 days of standing ($V_{30}$) | 77.71 | 76.95 | 77.49 | 76.87 | 77.18 | 77.62 |
| | 60 days of standing ($V_{60}$) | 77.33 | 76.57 | 77.15 | 76.45 | 76.80 | 77.27 |
| | Initial velocity difference ($V_{30} - V_0$) | 0.34 | 0.33 | 0.36 | 0.33 | 0.35 | 0.36 |
| | Initial velocity difference ($V_{60} - V_0$) | 0.72 | 0.71 | 0.70 | 0.75 | 0.73 | 0.71 |
| Ball properties | Deflection under load (mm), average | 2.25 | 2.90 | 2.31 | 3.04 | 2.60 | 2.18 |
| Spin rate (rpm) | Driver (W#1) | 2929 | 2572 | 2901 | 2554 | 2722 | 2939 |
| | Iron (I#6) | 6885 | 5903 | 6854 | 5864 | 6327 | 6880 |
| | Durability | good | good | good | good | good | good |
| | Feel at impact | NG | fair | fair | fair | good | NG |

It is apparent from the results in Tables 3 and 4 above that the golf balls in the Examples of the invention all achieved a reduced spin rate on shots with a driver, in addition to which the change over time in rebound, the durability and the feel at impact were all excellent.

By contrast, in Comparative Examples 1 to 6, because the moisture content in the rubber composition before vulcanization was low, the cores from which the covers were removed after molding of the cover underwent large decreases in initial velocity. Moreover, in Comparative Example 1, because the tan δ in the viscoelasticity at the core center was too large, the core was too receptive to spin. In Comparative Examples 2 to 6, the difference in crosslink density between the core surface and the core center was too small and the tan δ was too large, as a result of which it was difficult in each of these cases to maintain a good feel at impact. Moreover, a reduced spin rate could not be achieved.

The invention claimed is:

1. A golf ball comprising a core and a cover of one layer or a plurality of layers, wherein the core is formed of a material molded under heat from a rubber composition comprising the following components (A) to (C):
    (A) a base rubber,
    (B) an organic peroxide, and
    (C) water;
and the product P×E of the difference P (mol/m$^3$) in crosslink density between a surface of the core and a center of the core, as measured based on a toluene swelling test, multiplied by the deflection E (mm) of the core when compressed under a final load of 1,275 N (130 kgf) from an initial load state of 98 N (10 kgf) is at least $28 \times 10^2$ mol/m$^3$·mm.

2. The golf ball of claim 1, wherein the rubber composition before vulcanization has a moisture content of at least 1,000 ppm.

3. The golf ball of claim 1, wherein the core after vulcanization has a higher moisture content at the core center than at the core surface.

4. The golf ball of claim 1, wherein the difference between the crosslink density at the core surface and the crosslink density at the core center, both of which are crosslink densities measured based on a toluene swelling test, is at least $9 \times 10^2$ mol/m$^3$.

5. The golf ball of claim 1, wherein the rubber composition includes from 0.1 to 5 parts by weight of an organosulfur compound per 100 parts by weight of the base rubber.

6. The golf ball of claim 1, wherein the core of the golf ball after molding of the cover has an initial velocity $V_0$, as measured after peeling away the cover, of at least 77.0 m/s and not more than 78.5 m/s.

7. The golf ball of claim 1 which satisfies the relationship $V_0 - V_{60} < 0.7$, wherein $V_0$ is the initial velocity of the core in the golf ball after molding of the cover, as measured after peeling away the cover, and $V_{60}$ is the initial velocity of the core 60 days after measuring $V_0$.

8. The golf ball of claim 1 wherein, when the loss tangent of the core center is measured at a temperature of −12° C. and a frequency of 15 Hz, letting tan $\delta_1$ be the loss tangent at a dynamic strain of 1% and tan $\delta_{10}$ be the loss tangent at a dynamic strain of 10%, the slope of these tan δ values, expressed as [(tan $\delta_{10}$−tan $\delta_1$)/(10% −1% )], is not more than 0.003.

9. The golf ball of claim 1, wherein the JIS-C hardness difference obtained by subtracting a core center hardness from a core surface hardness is at least 20 and not more than 40.

10. A golf ball comprising a core and a cover of one layer or a plurality of layers, wherein the core is formed of a material molded under heat from a rubber composition comprising the following components (A) to (C):
    (A) a base rubber,
    (B) an organic peroxide, and
    (C) water;
and, when the loss tangent of the core center is measured at a temperature of −12° C. and a frequency of 15 Hz, letting tan $\delta_1$ be the loss tangent at a dynamic strain of 1% and tan $\delta_{10}$ be the loss tangent at a dynamic strain of 10%, the slope of these tan δ values, expressed as [(tan $\delta_{10}$−tan $\delta_1$)/(10% −1% )], is not more than 0.003.

11. The golf ball of claim 10, wherein the rubber composition before vulcanization has a moisture content of at least 1,000 ppm.

12. The golf ball of claim 10, wherein the core after vulcanization has a higher moisture content at the core center than at the core surface.

13. The golf ball of claim 10, wherein the core of the golf ball after molding of the cover has an initial velocity $V_0$, as measured after peeling away the cover, of at least 77.0 m/s and not more than 78.5 m/s.

14. The golf ball of claim 10, wherein the rubber composition includes from 0.1 to 5 parts by weight of an organosulfur compound per 100 parts by weight of the base rubber.

15. The golf ball of claim 10 which satisfies the relationship $V_0 - V_{60} < 0.7$, wherein $V_0$ is the initial velocity of the core in the golf ball after molding of the cover, as measured after peeling away the cover, and $V_{60}$ is the initial velocity of the core 60 days after measuring $V_0$.

16. The golf ball of claim 10, wherein the JIS-C hardness difference obtained by subtracting a core center hardness from a core surface hardness is at least 20 and not more than 40.

* * * * *